Patented Apr. 23, 1935

1,998,559

UNITED STATES PATENT OFFICE 1,998,559

ART OF VULCANIZING RUBBER

Robert L. Sibley, Nitro, W. Va., assignor to The Rubber Service Laboratories Company, Akron, Ohio, a corporation of Ohio No Drawing. Application March 23, 1931,
Serial No. 524,761

7 Claims. (Cl. 18—53)

This invention relates to the vulcanization of rubber by an improved process, wherein there is employed a member of a preferred class of compounds which improve the action of the accelerator used in the vulcanization process. More specifically, the preferred class of compounds act to retard the vulcanization in the earlier stages of the process, but do not exert such retarding action and may even accelerate the vulcanization in the later stages. This retarding effect is highly desirable, as scorching or vulcanizing on the mixing rolls is thereby materially decreased and in many cases substantially prevented. A substance which possesses the retarding properties described is known as a retarder. The preferred class of compounds employed in the manner hereinafter described comprises a nitro-aromatic hydroxide.

The retarding effects of a chemical compound in the process of vulcanizing rubber can be readily ascertained by incorporating a small portion of the compound or retarder in a rubber stock of vulcanization characteristics, preferably in the presence of an accelerator, heating portions of the rubber compound thus formed for various periods of time and under various pressures, and comparing the modulus of elasticity and tensile strength of the vulcanized product so formed with the modulus and tensile figures of another vulcanized rubber product prepared in the manner specified above but containing no retarder.

As examples showing the use of the preferred class of compounds, a rubber mix was prepared in the well known manner comprising

| | Parts |
|---|---|
| Pale crepe rubber | 100 |
| Zinc oxide | 5 |
| Sulfur | 3 |
| The crotonaldehyde derivative of the reaction product of mercaptobenzothiazole and hexamethylenetetramine | 0.6 |
| 2,4-dinitrophenol | 0.1 and/or 0.2 |

The mix was then vulcanized by heating under various pressures and for various periods of time. The cured stock was then tested to determine its modulus and tensile strength under various degrees of elongation. The results of the tests of the rubber composition thus described are set forth in Table I.

Table I

| Time of cure and steam pressure | No. parts dinitrophenol | Modulus of elasticity in lbs./in.$^2$ at elongations of | | | Tensile lbs./in.$^2$ at break | Ultimate elongation percent |
|---|---|---|---|---|---|---|
| | | 300% | 500% | 700% | | |
| 15 mins. at 10 lbs. steam per sq. in | None | 85 | 134 | 358 | 1,565 | 990 |
| | 0.1 | 56 | 94 | 209 | 998 | 1,030 |
| | 0.2 | Stock pitted | | | | |
| 20 mins. at 10 lbs. steam per sq. in | None | 94 | 178 | 482 | 1,955 | 970 |
| | 0.1 | 73 | 132 | 359 | 1,613 | 980 |
| | 0.2 | 90 | 138 | 332 | 1,520 | 1,010 |
| 30 mins. at 10 lbs. steam per sq. in | None | 137 | 302 | 1,025 | 2,540 | 900 |
| | 0.1 | 125 | 232 | 769 | 2,260 | 920 |
| | 0.2 | 100 | 201 | 651 | 2,100 | 950 |
| 90 mins. at 20 lbs. steam per sq. in | None | 257 | 636 | 2,335 | 3,530 | 780 |
| | 0.1 | 248 | 624 | 2,295 | 3,440 | 785 |
| | 0.2 | 229 | 549 | 2,080 | 3,370 | 795 |
| 120 mins. at 20 lbs. steam per sq. in | None | 237 | 687 | 2,460 | 4,090 | 810 |
| | 0.1 | 261 | 655 | 2,325 | 3,800 | 800 |
| | 0.2 | 252 | 638 | 2,293 | 3,950 | 815 |

It is readily apparent from the data set forth above that the preferred class of compounds, for example, 2,4-dinitrophenol, retard the vulcanization process in the shorter timed cures, but do not appreciably retard this process on longer heat treatment at the higher pressures.

As further examples of the use of the preferred class of materials, the following six stocks, designated by the letters A to F, were prepared and tested as in the manner above described.

*Table II*

| | Stock | | | | | |
|---|---|---|---|---|---|---|
| | A (pts.) | B (pts.) | C (pts.) | D (pts.) | E (pts.) | F (pts.) |
| Pale crepe rubber | 100 | 100 | 100 | 100 | 100 | 100 |
| Zinc oxide | 5 | 5 | 5 | 5 | 5 | 5 |
| Sulfur | 3 | 3 | 3 | 3 | 3 | 3 |
| Acetaldehyde derivative of the reaction product of para-para-diamino-diphenyl-methane and mercaptobenzothiazole, prepared according to the method set forth in the co-pending U. S. patent application, Serial No. 456,808 now matured into U. S. Patent 1,914,047 | 0.3 | 0.3 | 0.3 | 0.3 | 0.3 | 0.3 |
| Diphenylguanidine | 0.7 | 0.7 | 0.7 | 0.7 | 0.7 | 0.7 |
| Para-nitrophenol | | 0.1 | | | | |
| 2,6-dinitro-4-chlorophenol | | | 0.1 | | | |
| 1-nitro-2-naphthol | | | | 0.2 | | |
| 3,5-dinitro-o-cresol | | | | | 0.1 | |
| 3-nitro-p-cresol | | | | | | 0.2 |

The results of the tests upon the above rubber stocks after curing are given in Table III.

*Table III*

| Cure mins. | Steam pressure lbs./in.² | Stock | Modulus of elasticity in lbs./in.² at elongations of | | | Tensile at break lbs./in.² | Ultimate elongation percent |
|---|---|---|---|---|---|---|---|
| | | | 300% | 500% | 700% | | |
| 15 | 10 | A | 89 | 201 | 597 | 2,160 | 960 |
| 15 | 10 | B | 111 | 206 | 480 | 2,000 | 1,030 |
| 15 | 10 | C | 103 | 150 | 424 | 1,740 | 1,020 |
| 15 | 10 | D | 93 | 166 | 529 | 2,285 | 985 |
| 15 | 10 | E | 105 | 186 | 516 | 1,810 | 945 |
| 15 | 10 | F | 114 | 183 | 520 | 2,045 | 970 |
| 20 | 10 | A | 121 | 252 | 820 | 2,270 | 890 |
| 20 | 10 | B | 103 | 209 | 649 | 2,220 | 955 |
| 20 | 10 | C | 90 | 169 | 495 | 2,195 | 990 |
| 20 | 10 | D | 107 | 230 | 737 | 2,690 | 980 |
| 20 | 10 | E | 100 | 206 | 650 | 2,120 | 925 |
| 20 | 10 | F | 112 | 223 | 716 | 2,360 | 930 |
| 30 | 10 | A | 95 | 283 | 1,170 | 2,640 | 840 |
| 30 | 10 | B | 139 | 294 | 1,033 | 2,970 | 900 |
| 30 | 10 | C | 139 | 273 | 925 | 2,820 | 920 |
| 30 | 10 | D | 138 | 307 | 1,060 | 3,095 | 900 |
| 30 | 10 | E | 134 | 320 | 1,155 | 2,715 | 870 |
| 30 | 10 | F | 136 | 340 | 1,145 | 2,860 | 880 |
| 60 | 20 | A | 270 | 832 | 3,260 | 4,695 | 780 |
| 60 | 20 | B | 266 | 856 | 3,300 | 4,530 | 770 |
| 60 | 20 | C | 278 | 840 | 3,320 | 4,690 | 770 |
| 60 | 20 | D | 224 | 703 | 2,935 | 4,400 | 780 |
| 60 | 20 | E | 248 | 730 | 2,890 | 4,255 | 780 |
| 60 | 20 | F | 233 | 753 | 3,140 | 4,215 | 750 |
| 90 | 20 | A | 280 | 940 | 3,870 | 4,725 | 745 |
| 90 | 20 | B | 315 | 1,010 | 3,860 | 4,770 | 745 |
| 90 | 20 | C | 270 | 950 | 3,870 | 4,380 | 725 |
| 90 | 20 | D | 304 | 915 | 3,630 | 4,305 | 760 |
| 90 | 20 | E | 288 | 908 | 3,600 | 4,520 | 745 |
| 90 | 20 | F | 298 | 918 | 3,740 | 4,325 | 730 |

The results given in Table III show that the preferred class of compounds, for example paranitrophenol, 2,6-dinitro-4-chlorophenol, 1-nitro-2-naphthol, 3,5-dinitro-ortho-cresol, and 3-nitro-para-cresol, possess desirable retarding action on the curing process in the shorter timed and lower pressure cures, but show little or no retarding action in the longer timed and higher pressure cures, when present in a rubber stock of vulcanization characteristics.

Other nitro-aromatic hydroxides, for example, ortho-nitro-phenol, dinitro-naphthols, nitro-salicylic acids, nitro-resorcinols, nitro-chlorphenols, nitro-xylenols, and picric acid, may be employed in the vulcanization of rubber as retarders in the manner hereinbefore described.

This invention is not restricted to the use of the particular compounds given in the disclosure as examples, nor is it restricted to the use of the preferred class of compounds in the particular rubber mixes herein described. The invention is limited only by the claims attached hereto as part of the present application.

What is claimed is:

1. The process of retarding the vulcanization of rubber which comprises heating a mixture of rubber, sulfur and an accelerator comprising an aliphatic aldehyde derivative of a reaction product of an organic base and a mercaptobenzothiazole in the presence of a dinitrophenol as a retarder of the accelerating action thereof.

2. The process of retarding the vulcanization of rubber which comprises heating a mixture of rubber, sulfur and an accelerator comprising an aliphatic aldehyde derivative of a reaction product of an organic base and a mercaptobenzothiazole in the presence of 2,4-dinitrophenol as a retarder of the accelerating action thereof.

3. The process of retarding the vulcanization of rubber which comprises heating a mixture of rubber, sulfur and an accelerator comprising an aliphatic aldehyde derivative of a reaction product of an organic base and a mercaptobenzothiazole in the presence of a nitrophenol as a retarder of the accelerating action thereof.

4. The process of retarding the vulcanization of rubber which comprises heating a mixture of rubber, sulfur and an accelerator comprising an aliphatic aldehyde derivative of a reaction product of an organic base and mercaptobenzothiazole in the presence of a nitrophenol as a retarder of the accelerating action thereof.

5. The process of retarding the vulcanization of rubber which comprises heating a mixture of rubber, sulfur and an accelerator comprising an aliphatic aldehyde derivative of a reaction product of an organic base and mercaptobenzothiazole in the presence of a dinitrophenol as a retarder of the accelerating action thereof.

6. The process of retarding the vulcanization of rubber which comprises heating a mixture of rubber, sulfur and an accelerator comprising an aliphatic aldehyde derivative of a reaction product of an organic base and mercaptobenzothiazole in the presence of dinitrophenol as a retarder of the accelerating action thereof.

7. The process of retarding the vulcanization of rubber which comprises heating a mixture of rubber, sulfur and an accelerator comprising the crotonaldehyde derivative of the reaction product of mercaptobenzothiazole and hexamethylenetetramine in the presence of 2,4-dinitrophenol as a retarder of the accelerating action thereof.

ROBERT L. SIBLEY.